United States Patent [19]

Clerici et al.

[11] Patent Number: 5,241,119
[45] Date of Patent: Aug. 31, 1993

[54] PROCESS FOR THE PREPARATION OF 4,4'-DIAMINODIPHENYL-METHANE AND ITS DERIVATIVES

[75] Inventors: Mario G. Clerici, San Donato Milanese; Giuseppe Bellussi, Piacenza; Ugo Romano, Vimercate, all of Italy

[73] Assignees: Eniricerche S.p.A., Milan; Enichem Synthesis S.p.A., Palermo, both of Italy

[21] Appl. No.: 595,665

[22] Filed: Oct. 11, 1990

Related U.S. Application Data

[63] Continuation of Ser. No. 464,582, Jan. 11, 1990, abandoned, which is a continuation of Ser. No. 325,011, Mar. 17, 1989, abandoned, which is a continuation of Ser. No. 111,259, Oct. 22, 1987, abandoned.

[30] Foreign Application Priority Data

Oct. 22, 1986 [IT]  Italy ........................... 22071 A/86
Oct. 22, 1986 [IT]  Italy ........................... 22074 A/86

[51] Int. Cl.$^5$ .......................................... C07C 211/49
[52] U.S. Cl. ........................................ 564/332; 560/48
[58] Field of Search ....................... 564/330, 331, 332; 423/326

[56] References Cited

U.S. PATENT DOCUMENTS

| | | | |
|---|---|---|---|
| 3,496,239 | 2/1970 | Hamilton et al. | 564/332 X |
| 3,728,408 | 4/1973 | Tobias | 564/332 X |
| 4,011,278 | 3/1977 | Plank et al. | 564/332 X |
| 4,039,580 | 8/1977 | Frulla et al. | 564/332 |
| 4,052,456 | 10/1977 | Marquis et al. | 260/570 D |
| 4,071,558 | 1/1978 | Bentley | 260/570 X |
| 4,162,358 | 7/1979 | Marquis et al. | 564/332 X |
| 4,294,987 | 10/1981 | Prather et al. | 564/332 X |

FOREIGN PATENT DOCUMENTS

| | | |
|---|---|---|
| 2623681 | 1/1977 | Fed. Rep. of Germany . |
| 3202687 | 8/1983 | Fed. Rep. of Germany . |
| 2066809 | 7/1981 | United Kingdom . |

*Primary Examiner*—Richard L. Raymond
*Assistant Examiner*—B. M. Burn
*Attorney, Agent, or Firm*—Birch, Stewart, Kolasch & Birch

[57] ABSTRACT

Process for the preparation of 4,4'-diaminodiphenylmethane and its derivatives.

4,4'-diaminodiphenylmethane and its derivatives are prepared by the condensation of aniline, or its derivative, and aldehyde, or its precursor and/or isomerization of appropriate intermediate products. The reaction proceeds with zeolites acting as catalysts; these catalysts, which are selected in accordance with the reaction to be effected, are preferably zeolites based on Si, Al and B; Si, Al and Ti; Ti and Fe; ZSM-5; or Y zeolites.

20 Claims, No Drawings

PROCESS FOR THE PREPARATION OF 4,4'-DIAMINODIPHENYL-METHANE AND ITS DERIVATIVES

This application is a continuation of application Ser. No. 07/464,582 filed on Jan. 11, 1990, now abandoned, which is a continuation of Ser. No. 07/325,011 filed on Mar. 17, 1989, now abandoned, which is a continuation of Ser. No. 07/111,259 filed on Oct. 22, 1987, now abandoned.

FIELD OF THE INVENTION

The present invention relates to the preparation of 4,4'-diaminodiphenylmethane and derivatives thereof, the preparation being effected by the reaction, in the presence of a zeolite catalyst, of aniline or a derivative thereof with formaldehyde, or by the isomerization of N-(4-aminobenzyl)aniline or a derivative thereof.

DESCRIPTION OF THE PRIOR ART

As is well-known 4,4'-diaminodiphenylmethane is used as an inhibitor of corrosion, or as an intermediate substance for obtaining the corresponding diisocyanate, which is a very important product in the chemical industry, used for the synthesis of polymers, polyurethanes, epoxy resins and the like.

It is normally obtained from aniline or an aniline derivative. The recognized traditional process used for the production of 4,4'-diaminodiphenylmethane (J.Am. Chem. Soc. 57,888, 1975; Chem Tech, Nov. 1984, p.670; Kirk Othmer, Vol II, 3rd Edition, pp. 338-348) consists of causing aniline to react with formaldehyde in a concentrated strong acid solution (e.g. HCl, $H_2SO_4$, $H_3PO_4$, etc.).

Alternatively, a amine derivative can be used, such as methyl phenylcarbonate, which is condensed with formaldehyde to produce diurethane. From this, by pyrolysis, a diisocyanate can be obtained, with the free amine phase being by-passed. The general formula for the aniline derivatives that can be used is:

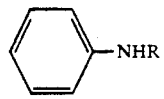

wherein R = —COOR' or —COR wherein R' is alkyl or aryl, either substituted or unsubstituted. Let us take as an example the case where R is —COOMe:

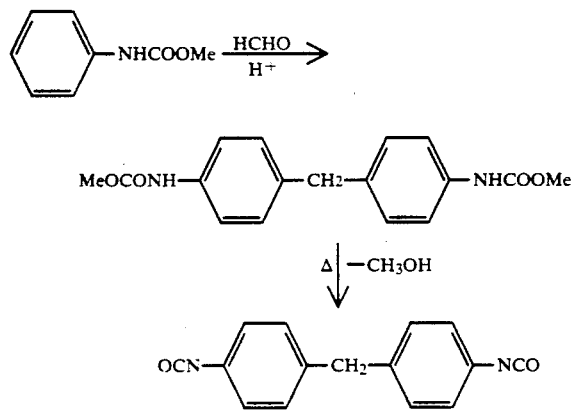

The conditions that are normally used in the known process require an excess of aniline, or one of its derivatives, relative to the formaldehyde, and a large quantity of strong soluble acid. Both of these conditions are indispensable requirements to ensure that the formation of-undesirable by-products is kept in check.

Under known procedure, therefore, the industrial production process suffers from the need to use large quantities of strong acid, which in turn necessitates the use of corrosion-resistant materials in the construction of the production plant. Apart from this, after the reaction has taken place, large amounts of bases are required to neutralize the acids, and this causes problems as regards the disposal of the resulting inorganic salts. A further problem arises when hydrochloric acid is used, since this leads to the formation of dichloromethane ether by the formaldehyde, which is a highly toxic substance.

SUMMARY OF THE INVENTION

It has now surprisingly been discovered, and this constitutes one of the subjects of the present invention, that the reaction in the form of a condensation with formaldehyde, or with a product capable of producing formaldehyde, under reactive conditions can be effected with the use of zeolite substances.

The resulting advantages are that a corrosion-free plant can be used; that a recyclable reagent (i.e. the zeolite) can be used; that expenditure on acids and bases is no longer necessary; and that the problem of the need to dispose of inorganic by-products does not arise. Zeolite, moreover, because of its particular porous crystalline solid structure and controlled 10 porosity, favours the formation of the 4,4'-diaminodiphenylmethane isomer (or derivatives thereof) at the expense of the other isomers and higher oligomers.

As a reagent, any substance that is capable of giving rise to formaldehyde under reactive conditions can be used. In particular, gaseous formaldehyde, or formaldehyde dissolved in solvent or trioxane, can be used.

The reaction can be carried out in an inert solvent, such as an alcohol, an aromatic or aliphatic hydrocarbon, an ether, or a chloroaromatic or nitroaromatic compound, etc., preferably at a temperature of the order of 50° C. to 200° C., generally from 100° C. to 150° C., and preferably by a solvent reflux process or in an autoclave, depending on the boiling point of the solvent used.

The pressure in the system is usually autogenous. It is preferable to use an excess of aniline relative to the formaldehyde, although the ratio between them is not as critical as it is when a mineral acid is used for condensation purposes. This is because the porosity of the zeolite impedes the formation of higher oligomers. This means that it is possible to operate with higher conversions, thus making savings in regard to acrolein recycling.

Reduced yields sometimes occur with the synthesis of 4,4'-diaminodiphenylmethane owing to the formation of appreciable quantities of N-(aminobenzyl)aniline and derivatives. As is known, these products can be isomerized in terms of diamino-derivatives through a catalyzed acid reaction:

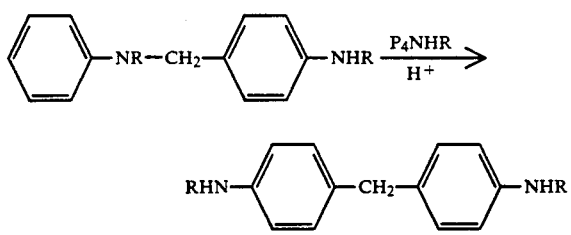

This reaction generally occurs in the presence of an excess of amine, through the action of a strong acid or carboxylic acid.

Often the acids concerned (e.g. trifluoroacetic acid and trifluoromethane-sulphonic acid) are expensive and used in massive quantities and need to be neutralized with soda once the reaction has taken place.

Moreover, unless appropriate construction materials are used, these substances can also cause corrosion in the production plant.

It has surprisingly been discovered that, and this constitutes another subject of the present invention, that isomerization can be effectively carried out with the use of catalysts of zeolite type. This isomerization reaction, which when the above-described synthesis is performed can be a direct result of the use of the zeolitic catalyst, can of course be used whatever basic method is employed for the preparation of 4,4'-diaminodiphenylmethane. The process, whether it is the reaction of aniline in the presence of zeolites (in this case the process can be accompanied by the analysis of the products), or whether N-(aminobenzyl) aniline, obtained by various means, is used, can be carried out in an inert solvent, e.g. a saturated or aromatic hydrocarbon, an ether, an alcohol, or a chloroaromatic or nitroaromatic compound, at a temperature of from ambient temperature to 200° C., generally from 70° C. to 150° C. The reaction pressure is usually autogenous.

DETAILED DESCRIPTION

The preferred types of zeolite that are used in the processes that are the subject of the present invention are those corresponding to the following general formula, expressed in terms of molar ratios of oxides (in calcined anhydrous form):

(1) $pHAlO_2 \cdot qB_2O_3 \cdot SiO_2$

In formula (1), p has a value of from 0.034 to 0.0050 and q of a value of from 0.1 to 0.005, with the $H^+$ of the $HAlO_2$ being replaceable, at least in part, by cations. This zeolite has an X-ray diffraction spectrum (powder sampling) whose significant lines are as given in Table A:

TABLE A

| d | $I_{rel}$ |
| --- | --- |
| 11.12 + 0.10 | vs |
| 9.98 + 0.10 | s |
| 9.74 + 0.10 | m |
| 6.34 + 0.07 | mw |
| 5.97 + 0.07 | mw |
| 4.24 + 0.05 | mw |
| 3.84 + 0.04 | s |
| 3.81 + 0.04 | s |
| 3.73 + 0.04 | s |
| 3.71 + 0.04 | s |
| 3.63 + 0.04 | m |
| 3.04 + 0.02 | mw |

TABLE A-continued

| d | $I_{rel}$ |
| --- | --- |
| 2.97 + 0.02 | mw | wherein d are the interplanar distances in Angstroms and $I_{rel}$ the relative strengths, with vs standing for very strong, s for strong, m for medium, mw for medium weak and w for weak, and an IR spectrum having the following bands:

| wn | $I_{rel}$ |
| --- | --- |
| 1220–1230 | w |
| 1080–1110 | s |
| 890–920 | mw |
| 795–805 | mw |
| 550–560 | m |
| 450–470 | ms | wherein wn stands for the wave number in $cm^{-1}$ and $I_{rel}$ for the relative strengths, with s standing-or strong, ms for medium strong, m for medium, mw for medium weak and w for weak.

(2) $pHAlO_2 \cdot qTiO_2 \cdot SiO_2$

In the formula (2), p has a value greater than zero and less than or equal to 0.050 and q has a value greater than zero and less than or equal to 0.025, with the $H^+$ of the $HAlO_2$ being replaceable, in part at least, by cations. This zeolite has an X-ray diffraction spectrum (powder sampling) whose more significant lines are as given in Table B:

TABLE B

| d | $I_{rel}$ |
| --- | --- |
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.86 + 0.04 | s |
| 3.82 + 0.04 | s |
| 3.75 + 0.04 | s |
| 3.72 + 0.04 | s |
| 3.65 + 0.04 | m |
| 3.05 + 0.02 | mw |
| 2.99 + 0.02 | mw | wherein d are the interplanar distances in Angstroms and $I_{rel}$ the relative strengths, with vs standing for very strong, s for strong, m for medium, mw for medium weak and w for weak, and an IR spectrum having at least the following bands:

| wn | $I_{rel}$ |
| --- | --- |
| 1220–1230 | w |
| 1080–1110 | s |
| 960–975 | mw |
| 795–805 | mw |
| 550–560 | m |
| 450–470 | ms | wherein wn stands for the wave number in $cm^{-1}$ and $I_{rel}$ for the relative strengths, with s standing for strong, ms for medium strong, m for medium, mw for medium weak and w for weak.

(3) ZSM-5 (as per U.S. Pat. No. 3,702,886 and U.S. Reissue Pat. No. 29948)

4) $xTiO_2 \cdot (1-x)SiO_2$

In formula (4), x is from 0.0001 to 0.04, usually from 0.01 to 0.025 (for further particulars see U.S. Pat. No. 4,410,501).

(5) $pHFeO_2 \cdot qTiO_2 \cdot SiO_2$

In formula (5), p has a value greater than zero but less than or equal to 0.050 and q has a value greater than zero but less than or equal to 0.025, with the $H^+$ of the $HFeO_2$ being replaceable or replaced, at least in part, by cations. This zeolite has an X-ray diffraction spectrum (powder sampling) whose more significant lines are as given in Table C:

TABLE C

| d | $I_{rel}$ |
|---|---|
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.86 + 0.04 | s |
| 3.82 + 0.04 | s |
| 3.75 + 0.04 | s |
| 3.72 + 0.04 | s |
| 3.65 + 0.04 | m |
| 3.05 + 0.02 | mw |
| 2.99 + 0.02 | mw | wherein d are the interplanar distances in Angstroms and $I_{rel}$ the relative strengths, with vs standing for very strong, s for strong, m for medium, mw for medium weak and w for weak, and an IR spectrum having at least the following bands:

| wn | $I_{rel}$ |
|---|---|
| 1220–1230 | w |
| 1080–1110 | s |
| 960–975 | mw |
| 795–805 | mw |
| 550–560 | m |
| 450–470 | ms | wherein wn stands for the wave number in $cm^{-1}$ and $I_{rel}$ for the relative strengths, with s standing strong, ms for medium strong, m for medium, mw for medium weak and w for weak.

(6) Y zeolites partly in acid form and exchanged by metal cations, including SK 40, SK 41 and SK 500, as marketed by Union Carbide's Linde Division.

Zeolites nos. 1,2,3,4,5 and 6, respectively, can be prepared by the processes described below.

ZEOLITE NO. 1

A derivative of silicon, a derivative of boron, a derivative of aluminium and a nitrogenous organic base are caused to react under hydrothermal conditions, the $SiO_2/Al_2O_3$ molar ratio of the reagents being greater than 100 and generally from 300 to 400, the $SiO_2/B_2O_3$ molar ratio of the reagents being from 5 to 50 and the $H_2O/SiO_3$ ration of the reagents being generally from 20 to 40, with as appropriate the presence of a salt or salts and/or alkali metal hydroxides or alkaline earth metal hydroxides with an $M/SiO_2$ molar ratio (where M is the alkali metal cation and/or the alkaline earth metal cation) for the reagents of less than 0.1 and usually less than 0.01 or zero.

In the empirical formula for the material, aluminium has been shown as $HAlO_2$, to indicate that the material in question is in $H^+$ form; in referring to the ratios between the various reagents, however, we use the symbol $Al_2O_3$, since this is more commonly used.

The derivatives of silicon is generally selected from silica gel, silica sol and alkyl silicates, generally tetraethyl silicate; the derivative of boron is generally selected from boric acid and the organic derivatives of boron, for instance the alkyl borates, with triethyl borate being the one generally used; the derivative of aluminium is generally selected from the salts thereof, such as, for example, the halides and hydroxides, and the organic derivatives thereof, such as the alkyl aluminates, usually isopropylaluminate.

The nitrogenous organic base can be an alkylammonium hydroxide; tetrapropylammonium hydroxide is the usual base.

If tetrapropylammonium hydroxide is used, the $TPA^+/SiO_2$ ratio (where TPA=tetrapropylammonium) of the reagents is usually between 0.1 and 1, and more usually between 0.2 and 0.4.

The reagents are usually caused to react at an operating temperature of from 100 to 200° C., and generally from 160 to 180° C., at a pH of from 9 to 14, mostly from 10 to 12, and for a period of time varying from 1 hour to 5 days, but generally from 3 to 10 hours.

ZEOLITE NO 2

A derivative of silicon, a derivative of titanium, a derivative of aluminium and a nitrogenous organic base are caused to react under hydrothermal conditions, with the $SiO_2/Al_2O_3$, molar ratio of the reagents being greater than 100 and usually from 300 to 400, with the $SiO_2/TiO_2$ molar ratio being greater than 5, generally from 15 to 25, and with the $H_2O/SiO_2$ ratio being, in general, from 10 to 100, more usually from 30 to 50, with, as appropriate, the presence of a salt or salts and/or an alkali metal hydroxide or an alkaline earth metal hydroxide, with a $M/SiO_2$ (where M is the alkali metal cation and/or alkaline earth metal cation) molar ratio of the reagents of less than 0.1, generally less than 0.01, or zero.

In the empirical formula for the material, aluminium has been represented by $HAlO_2$, to indicate that the material is in $H^+$ form; in referring to the ratios between the various reagents, however, we use the symbol $Al_2O_3$, since this is more commonly used.

The derivative of silicon is generally selected from silica gel, silica sol and the alkyl silicates, of which tetraethyl silicate is generally used; the derivative of titanium is generally selected from salts thereof, the halides for example, and organic derivatives thereof, such as, for instance, alkyl titanates, of which tetraethyl titanate is mostly used; the derivative of aluminium is usually selected from salts thereof, such as the halides and hydroxides, for example, and from organic derivatives thereof, such as alkyl aluminates, usually isopropylaluminate.

The nitrogenous organic base can be alkylammonium hydroxide, usually tetrapropylammonium hydroxide.

If tetrapropylammonium hydroxide is used, the $TPA^+/SiO_2$ ratio (where TPA=tetrapropylammonium) of the reagents is usually from 0.1 to 1, mostly from 0.2 to 0.4.

The reagents are usually caused to react at an operating temperature of from 100 to 200° C., more usually from 160 to 180° C., at a pH of from 9 to 14, mostly from 10 to 12, and for a period of time of from 1 hour to 5 days, generally from 3 to 10 hours.

ZEOLITE NO. 3

ZMS-5 is prepared as per U.S. Pat. No. 3,702,886 or U.S. Reissue Pat. No. 29948.

ZEOLITE NO. 4

This is prepared as per U.S. Pat. No. 4,410,501.

ZEOLITE NO. 5

A derivative of silicon, a derivative of titanium, a derivative of iron and a nitrogenous organic base are caused to react under hydrothermal conditions, with a $SiO_2/Fe_2O_3$ molar ratio of the reagents greater than 50 and usually from 150 to 600, a $SiO_2/TiO_2$ molar ratio of the reagents greater than 5, usually from 15 to 25, and a $H_2O/SiO_2$ ratio of the reagents generally from 10 to 100, more preferably from 30 to 50, with as appropriate the presence of a salt or salts and/or an alkali metal hydroxide or alkaline earth metal hydroxide, with an $M/SiO_2$ molar ratio (where M is the alkali metal cation or alkaline earth metal cation) of the reagents of less than 0.1, usually less than 0.01, or zero.

In the empirical formula from the material, iron has been represented as $HAlO_2$, to indicate that the material is in $H^+$ form; in referring to the ratios between the various reagents, however, we use the symbol $Fe_2O_3$, since this is more commonly used.

The derivative of silicon is usually selected from silica gel, silica sol and alkyl silicates, of which tetraethyl silicate is mostly used; the derivative of titanium is usually selected from salts thereof, the halides for example, and organic derivatives thereof, such as, for instance, alkyl titanates, of which tetraethyl titanate is generally used; the derivative of iron is usually selected from salts thereof, such as halides, for example, or from nitrates, hydroxides and organic derivatives such as, for instance, hydroxides thereof The nitrogenous organic base can be alkylammonium hydroxide, tetrapropylammonium hydroxide being the most usual.

If tetrapropylammonium hydroxide is used, the $TPA^+/SiO_2$ ratio (where TPA=tetrapropylammonium) of the reagents is usually from 0.1 to 1, more usually from 0.2 to 0.4.

The reagents are usually caused to react at an operating temperature of from 100 to 200° C., more usually from 160° C. to 180° C., at a pH or from 9 to 14, generally from 10 to 12, and for a period of time of from 1 hour to 5 days, usually from 3 to 10 hours.

ZEOLITE NO. 6

The preparation of Y zeolite involves the exchange, in part in acid form and subsequently with metal cations, of a commercial Y zeolite, including the types SK 40, SK 41 and SK 500 marketed by Union Carbide's Linde Division.

In another method of putting the present invention into effect, zeolites nos. 1,2,4 and 5 can be in a form wherein an amorphous oligomeric silica acts as a binder, whereby the molar ratio between the oligomeric silica and the zeolite no. 1 or zeolite no. 2 or zeolite no. 4 or zeolite no 5 is from 0.5 to 0.12, the crystals of zeolite no. 1 or zeolite no. 2 or zeolite no. 4 or zeolite no. 5 being caged by Si-O-Si bridges and the crystalline mass of zeolites and silica being in the form of microspheres with a diameter of from 5 to 1000 microns.

One process for preparing catalysts nos. 1,2,4 and 5 having the binder consists in dissolving zeolite no. 1 or zeolite no. 2 or zeolite no. 4 or zeolite no. 5 in an aqueous solution of silica and tetraalkylammonium hydroxide, generally with alkyls having from 1 to 5 carbon atoms and usually tetrapropylammonium, the solution being prepared by the hydrolization at a temperature of from ambient temperature to 200° C., usually from 40 to 100° C., of a tetraalkylorthosilicate, usually tetraethylorthosilicate, in a liquid state in an aqueous solution of tetraalkylammonium hydroxide, for a time of from 0.2 to 10 hours, each zeolite containing a percentage weight of organic base of from 7 to 12% and of water of from 23 to 28%, after which the suspension thus obtained is placed in a rapid drier.

The following examples are examples of specific methods of preparation of the zeolites used (not an exhaustive list).

EXAMPLE

ZEOLITE NO. 1

67.8 g of $Al(NO_3)_3 \cdot 9H_2O$ were dissolved in 1275 g of ethyl alcohol, to which were added 2819 g of tetraethylsilicate, under constant agitation. The agitation was continued until a clear, homogeneous solution was obtained.

Next were added, in the order given, in a stainless steel receptacle, under agitation, 1036 g of de-ionized water, 8878 g of an aqueous solution of 15% by weight of tetrapropylammonium ($TPA^+$) hydroxide and 167.5 g of boric acid in powder form.

When the acid had dissolved, the solution previously obtained was added to it and the mixture was agitated and heated at 60° C. for approximately 4 hours, or at any rate until the silicate had been completely hydrolyzed and the ethyl alcohol present in the mixture had been virtually eliminated. The molar composition of the reaction mixture was as follows:

$SiO_2/Al_2O_3=150$; $SiO_2/B_2O_3=10$; $TPA^+/SiO_2=0.5$ $H_2O/SiO_2=35$.

The solution thus obtained was discharged into an autoclave equipped with an agitator and heated under agitation and autogenous pressure at 170° C. for 4 hours. After being discharged from the autoclave, the product was centrifuged and the residual cake thoroughly dispersed in 70 litres of de-ionized water. The suspension thus obtained was centrifuged once again to provide a washed cake.

The cake was calcined in air for 5 hours at 550° C., at the end of which time it was found to be a zeolite, the anhydrous form of which had the following composition:

0.0098 $Al_2O_3$; 0.0108 $B_2O_3$; 1 $SiO_2$.

EXAMPLE 2

ZEOLITE NO. 1 WITH BINDER

The procedure was the same as Example 1. Then, 219 g of tetraethylsilicate were added under vigorous agitation to 234 g of a solution of 12% by weight of tetrapropylammonium hydroxide. The mixture was agitated for 1 hour, then 958 g of demineralized water were added, followed by further agitation for another hour. This produced a clear solution in which the zeolite no. 1 previously prepared was thoroughly dispersed, containing 9% by weight of $TPA^+$ and 26% by weight of water.

The milky suspension resulting from the dispersion was fed into a spray-drier (namely a disc atomizer made by NIRO ATOMIZER, the air temperature at the entrance being 300° C. and 120° C. at the exit, and the diameter of the chamber being 1 5 m), which produced compact microspheres having an approximate average diameter of 20 microns.

The atomized product was placed in a muffle furnace in an atmosphere of $N_2$ and heated to 550° C. After remaining for two hours at this temperature in $N_2$, the atmosphere was gradually lowered from $N_2$ to air pressure and the product left for a further two hours in air at 550° C. The product thus obtained had the following molar composition:

0.0088 $Al_2O_3$;0.0097 $B_2O_3$; 1$SiO_2$.

EXAMPLE 3

27 g of isopropylate were dissolved in 5400 g of a solution of 18.7% tetrapropylammonium hydroxide by weight.

230 g of tetraethylorthotitanate were separately dissolved in 4160 g of tetraethylsilicate, and the solution was then added to the first solution, under agitation.

Next, the mixture was heated, still under agitation, at 50 to 60° C. until a single phase solution was obtained, whereupon 10 liters of water were added.

The solution thus obtained was placed in an autoclave and heated for four hours at 170° C. under autogenous pressure.

The product was then discharged, centrifuged and washed twice by redispersion and centrifuging. The washed cake was calcined in air for 5 hours at 550° C., at the end of which time it was found to be zeolite, the anhydrous form of which had the following composition:

0.0081 $Al_2O_3$;0.0250 $TiO_2$; 1 $SiO_2$.

EXAMPLE 4

ZEOLITE NO. 2 WITH BINDER

The procedure was the same as Example 3. Then, 320 g of tetraethylsilicate were added under vigorous agitation to 340 g of a solution of tetrapropylammonium hydroxide in a proportion of 12% by weight; the mixture was agitated for one hour, then 1400 g of demineralized water were added, followed by further agitation for another hour. This produces a clear solution in which the zeolite no. 2 previously prepared was thoroughly dispersed, containing 9% by weight of TPA+ and 26% by weight of water.

The milky suspension resulting from the dispersion was fed into a spray-drier (namely a disc atomizer made by NIRO ATOMIZER, the air temperature at the entrance being 300° C. and 120° C. at the exit, and the diameter of the chamber being 1.5 m), which produced compact microspheres with an approximate average diameter of 20 microns.

The atomized product was placed in a muffle furnace in an atmosphere of $N_2$ and heated to 550° C. After remaining for two hours at the same temperature in $N_2$, the atmosphere was gradually lowered from $N_2$ to air pressure, and the product left for a further two hours in air at 550° C. The product thus obtained had the following molar composition:

0.0073 $Al_2O_3$;0.0225 $TiO_2$; 1$SiO_2$.

EXAMPLE 5

ZEOLITE NO. 3

This is prepared as per U.S. Pat. No. 3,702,886 and U.S. Reissue Pat. No. 29948.

EXAMPLE 6

ZEOLITE NO. 4

This is prepared as per U.S. Pat. No. 4,410,501, and as follows.

Titanium silicate is first prepared as follows. 487 g of $TiOCl_2$ were dissolved in 26350 g of an aqueous solution of tetrapropylammonium hydroxide (TPA/OH) in the proportion of 14% by weight, and to this mixture were added, under vigorous agitation, 14538 g of colloidal silica in the proportion of 30%. The mixture was next heated at 60° C. for approximately two hours, being agitated throughout, after which 29680 g of mineralized water were added and the mixture was then agitated for a further hour at 60° C. The resulting clear solution, with the following molar composition:

5 TPA-PH;1$TiO_2$; 20 $SiO_2$; 800 $H_2O$ was placed in an autoclave, equipped with an agitator, under constant agitation at 170° for three hours.

The milky suspension thus obtained, containing zeolite microcrystals in suspension, was centrifuged and the residual cake is then washed by redispersion in water, following which it was recovered by means of further centrifuging.

At the same time 1346 g of tetraethyl silicate were added under vigorous agitation to 1437 g of a solution of tetrapropylammonium hydroxide in the proportion of 12% by weight and agitated for 1 hour. 5890 g of demineralized water were then added, and the mixture was agitated for a further hour. This produced a clear solution in which the titanium silicate previously prepared was thoroughly dispersed, containing 9% by weight of TPA+ and 26% by weight of water.

The milky suspension resulting from this dispersion was fed into a spray-drier (namely a disc atomizer made by NIRO ATOMIZER, the air temperature at the entrance being 300° C. and 120° C. at exit, and the diameter of the chamber being 1.5 m), which produced compact microspheres with an appropriate average diameter of 20 microns.

The atomized product was placed in a muffle furnace in an atmosphere of $N_2$ and heated to 550° C. After remaining in $N_2$ at this temperature for two hours, the atmosphere was gradually lowered to air pressure, and the product left for a further two hours in air at 550° C. The product thus obtained has the following molar composition:

1 $TiO_2$;43 $SiO_2$.

EXAMPLE 7

ZEOLITE NO. 5

This example describes how titanium silicalite is prepared.

202 g of $Fe(NO_3)_3\cdot9H_2O$ were dissolved in water, and a precipitate of hydroxide was formed in the solution by the addition of ammonium hydroxide. The precipitate was filtered and washed by redispersion in cold water and filtering until the filtrate was neutralized. The subsequent step is for the wet hydroxide to be dissolved in 27000 g of a solution of tetrapropylammonium hydroxide in the proportion of 18.7% by weight. 1140 g of tetraethylorthotitanate were separately dissolved in 20800 g of tetraethylorthosilicate, and this solution was then added to the first solution under agitation.

The mixture was then heated at 50°-60° C., still under agitation, until a single phase solution was obtained, whereupon 50 litres of water were added.

The solution thus obtained was then fed into an autoclave and heated for four hours under autogenous pressure at 170° C.

After discharge the product was centrifuged and washed twice by means of redispersion and centrifuging, dried for 1 hour at 120° C. and then calcined for 4 hours at 550° C. in air.

The product thus obtained had the following composition:

0.0025 $Fe_2O_3$; 0.0208 $TiO_2$; 1 $SiO_2$.

EXAMPLE 8

ZEOLITE 5 WITH BINDER

The process of Example 7 was followed, after which 1620 g of tetraethylsilicate were added under vigorous agitation to 1730 g of a solution of tetrapropylammonium hydroxide, 12% by weight, and the mixture was then agitated for 1 hour. Next, 7090 g of demineralized water were added and the whole was agitated for a further hour. This produced a clear solution in which the titanium silicalite previously prepared was thoroughly dispersed, containing 9% by weight of TPA+ and 26% by weight of water.

The milky suspension resulting from the dispersion was fed into a spray-drier (namely a disc atomizer made by NIRO ATOMIZER, the air temperature at the entrance being 300° C. and 120° C. at the exit, and the diameter of the chamber being 1.5 m) which produced compact microspheres with an approximate average diameter of 20 microns.

The atomized product was placed in a muffle furnace in an atmosphere of $N_2$ and heated to 550° C. After remaining for 2 hours at this temperature in $N_2$, the atmosphere was then gradually lowered to air pressure, and the product left for a further two hours in air at 550° C.

The product thus obtained had the following molar composition:

0.0023 $Fe_2O_3$; 0.0188 $TiO_2$; 1 $SiO_2$.

EXAMPLES 9-14

12 ml of aniline, 1.5 g of trioxane dissolved in 60 ml of benzene and 3 g of catalyst were placed in a glass autoclave. The suspension was heated at 120° C. under agitation for a period of five hours. After it had cooled, the solvent was distilled off and the residue extracted using ethyl alcohol.

The reaction products were quantitatively analyzed and identified by gas chromatography and mass spectrometry in relation to authentic samples.

The results are shown in Table 1 below (the higher oligomers are not included).

EXAMPLES 15-18

12 ml of aniline, 1.5 g of trioxane dissolved in 60 ml of benzene and 3.3 g of catalyst with binder were placed in a glass autoclave. The suspension was heated under agitation at 120° C. for a period of five hours. After it had cooled, the solvent was removed and the organic part extracted using ethyl alcohol.

The reaction products were quantitatively analyzed and identified by gas chromatography and mass spectrometry in relation to authentic samples.

The results are shown in Table 2 below (the higher oligomers are not included).

EXAMPLE 19

12 ml of aniline, 6 g of trioxane dissolved in 60 ml of benzene and 3g of zeolite no. 1 were placed in a glass autoclave.

The suspension was heated under agitation at 120° C. for 5 hours. After being separated out from the zeolite in the manner described under the previous Examples, the reaction products were analyzed and identified by gas chromatography and mass spectrometry.

| | |
|---|---|
| Aniline conversion | 29% |
| Selectively in: N-(4-aminobenzyl) aniline | 30% |
| 2,4'diaminodiphenylmethane | 9% |
| 4,4'diaminodiphenylmethane | 61% |

Traces of higher oligomers were present.

EXAMPLE 20

50 g of Y zeolite in sodium form (Union Carbide SK 40) were exchanged with 25 g of $NH_4Cl$ in 100 cc of water for two hours to allow settling. The zeolite was filtered and washed several times with deionized water, then dried and calcined for 4 hours at 550° C.

2 g of the zeolite prepared in this way were then suspended in a solution of 8 g of aniline and 1 g trioxane in 40 cc of benzene, in a glass autoclave.

The suspension was heated under agitation for 4 hours at 120° C. After the solvent had been cooled and distilled off, the organic part was extracted by means of ethyl alcohol. The reaction products were analyzed quantitatively by gas chromatography and mass spectrometry.

| | |
|---|---|
| Aniline conversion | 6% |
| Selectively in: N-(4-aminobenzyl)aniline | 10% |
| 2,4'-diaminodiphenylmethane | 29% |
| 4,4'-diamiodiphenylmethane | 59% |
| Higher oligomers | 2% |

EXAMPLES 21-29

8 g of Y zeolite in exchanged H+ form (see Example 20) were suspended in 50 ml of water containing $3.8 \times 10^{-3}$ moles of preselected salt. The suspension was heated for settling for 2 hours and then filtered. The solid was washed several times with distilled water and then dried at 110° C.

Zeolites exchanged in this manner have the composition given in Table 3 below.

2 g of a zeolite prepared in this way were suspended in a solution of 8 g of aniline and 1 g of trioxane in 40 cc of benzene in a glass autoclave. The mixture was heated at 120° C. under agitation for 1 hour and, after the solvent had been cooled and distilled off, the reaction products were extracted from the residue by using ethyl alcohol, and subsequently quantified by gas chromatography and mass spectrometry. The results are given in Table 4 below.

EXAMPLE 30

12 g of acetanilide, 1.5 g of trioxane and 60 cc of benzene, with 4 g of zeolite no.1, were placed in a glass autoclave for 6 hours at 120° C., and agitated magnetically. The solvent was removed from the reaction mixture by extraction with alcohol, and the product submitted to quantitative analysis by means of gas chromatography and mass spectrometry. The sole derivative of the acetanilide was 4,4'-diacetylaminodiphenylmethane (26% yield).

EXAMPLE 31

A solution of 10 g of methyl N-phenylcarbamate and 2 g of trioxane were placed in an autoclave along with 3 g of zeolite no.2. The suspension was heated under agitation for two hours at 150° C. after which it was cooled and the solvent evaporated. The organic part was extracted from the residue by alcohol and analyzed by gas chromatography and mass spectrometry for comparison with authentic samples. The results were:

| | |
|---|---|
| Methyl phenylcarbamate | 6.1 g |
| 4,4'-bis(methoxycarbonylamino)diphenylmethane | 3.0 g |
| 2,4'-bis(methoxycarbonylamino)diphenylmethane | 0.3 g |
| N-(methoxycarbonyl-N-(4-methoxycarbonylamine)aniline | 0.5 g. |

EXAMPLE 32

A solution of 8 g of methyl N-phenylcarbamate and 1.5 g of trioxane were placed in an autoclave together with 2 g of zeolite Y partly in H+ form and exchanged with FeCl$_3$ (see Example No. 2 and Table 3). The suspension was heated under agitation for 3 hours at 120° C., after which it was cooled and the solvent evaporated. The organic part was extracted with alcohol and submitted to analysis by gas chromatography and mass spectrometry for comparison with authentic samples. The results were:

| | |
|---|---|
| Methyl N-phenylcarbamate | 4.1 g |
| 4,4'-bis(methoxycarbonylamino)diphenylmethane | 3.1 g |
| 2,4'-bis(methoxycarbonylamino)diphenylmethane | 0.3 g |
| N-(methoxycarbonyl-N-(4-methoxycarbonylamino)aniline | 0.4 g. |

EXAMPLE 33

2 g of N-(4-aminobenzyl)aniline were placed in a glass autoclave together with 20 cc of benzene, 2 g of aniline and 1 g of zeolite no.1. The mixture was heated at a temperature of 135° C. for 3 hours, and agitated magnetically. The solvent was evaporated after being cooled, and the organic part extracted from the residue by alcohol. The reaction products were then analyzed and quantified by gas chromatography and mass spectrometry. The results were:

| | |
|---|---|
| Aniline | 1.9 g |
| N-(aminobenzyl)aniline | 0.2 g |
| 2,4'-diaminodiphenylmethane | 0.1 g |
| 4,4'-diaminodiphenylmethane | 1.6 g. |

The ethanol was distilled off from the solution and the oily residue redissolved in benzene. The solvent was then re-evaporated, 20 cc of benzene being used for the recovery, and the solution was placed in a glass autoclave together with 1 g of zeolite no.2. It was next heated at 120° C. for 3.5 hours, and agitated throughout. From analysis, the new distribution of the products of the reaction process (without aniline) was found to be as follows:

| | |
|---|---|
| N-(4-aminobenzyl)aniline | 8% |
| 2,4'-diaminodiphenylmethane | 15% |
| 4,4'-diaminodiphenylmethane | 77%. |

EXAMPLE 35

2 g of N-(aminobenzyl)aniline were placed in a glass autoclave together with 20 cc of benzene, 2 g of aniline and 1.1 g of zeolite no.1 with binder. The mixture was then heated at a temperature of 135° C. for 3 hours, and agitated magnetically. After cooling, the mixture from the reaction process was analyzed, with the following results:

| | |
|---|---|
| Aniline | 1.9 g |
| N-(aminobenzyl)aniline | 0.2 g |
| 2,4'-diaminodiphenylmethane | 0.1 g |
| 4,4'-diaminodiphenylmethane | 1.6 g. |

EXAMPLE 36

6 ml of aniline and 1 g of trioxane were dissolved in 30 cc of benzene and caused to react with 2.2. g of zeolite no.5 with binder in an autoclave, under agitation, at 120° C. for 5 hours. The solvent was evaporated from the reaction mixture, and the residue dissolved in ethanol and filtered for elimination of the catalyst. The products of the reaction were then analyzed and quantified by gas chromatography and mass spectrometry, with the following results:

| | |
|---|---|
| Aniline conversion | 22% |
| Selectivity in: N-(aminobenzyl)aniline | 41% |
| 2,4'-diaminodiphenylmethane | 15% |
| 4,4'-diaminodiphenylmethane | 44%. |

The ethanol was distilled off from the solution and the oily residue redissolved in benzene. The solvent was re-evaporated and 20 cc of benzene were used for recovery. Next, the mixture was placed in a small glass autoclave-together with 1.1 g of zeolite no. 2 with binder. The whole was then heated for 3.5 hours at 120° C., under constant agitation.

When analyzed, the products of the reaction (leaving out aniline) were found to be as follows:

| | |
|---|---|
| N-(aminobenzyl)aniline | 8% |
| 2,4'-diaminodiphenylmethane | 15% |
| 4,4'-diaminodiphenylmethane | 77%. |

EXAMPLE 37

2 g of N-(aminobenzyl)aniline were placed in a glass autoclave together with 20 cc of benzene, 2 g of aniline and 1 g of zeolite. The mixture was heated at a temperature of 145° C. for 4 hours, and was magnetically agitated throughout. After it had been cooled the mixture resulting from the reaction was analyzed. The results were:

| | |
|---|---|
| Aniline | 1.9 g |
| N-(aminobenzyl)aniline | 0.4 g |

-continued

| | |
|---|---|
| 2,4'-diaminodiphenylmethane | 0.1 g |
| 4,4'-diaminodiphenylmethane | 1.4 g. |

EXAMPLE 40

2 g of N-(4-aminobenzyl)aniline were placed in a glass autoclave together with 20 cc of benzene, 2 g of aniline and 1.1 g of zeolite 5 with binder. The mixture was heated at a temperature of 145° C. for 4 hours, and was magnetically agitated throughout. After it had been cooled the mixture resulting from the reaction was analyzed. The results were:

| | |
|---|---|
| Aniline | 1.9 g |
| N-(aminobenzyl)aniline | 0.4 g |
| 2,4'-diaminodiphenylmethane | 0.1 g |
| 4,4'-diaminodiphenylmethane | 1.4 g. |

EXAMPLE 39

3 g of N-(4-aminobenzyl)aniline were placed in a glass autoclave together with 30 cc of benzene, 1.5 g of aniline and 1 g of zeolite ZSM-5. The mixture was heated at a temperature of 135° C. for 3.5 hours, and was magnetically agitated throughout. After the mixture had been cooled, the solvent had been evaporated and the organic part extracted from the residue, the mixture resulting from the reaction was submitted to chromatographic and mass spectrometric analysis. The results were:

| | |
|---|---|
| Aniline | 1.4 g |
| N-(aminobenzyl)aniline | 0.3 g |
| 2,4'-diaminodiphenylmethane | 0.3 g |
| 4,4'-diaminodiphenylmethane | 2.3 g. |

EXAMPLE 40

10 g of zeolite Y in sodium form (Union Carbide SK 40) were suspended in a solution of 5 g of ammonium chloride and 30 cc of water.

The suspension was heated for settling for 2.5 hours, then cooled, filtered and washed several times with distilled water. The solid, after being dried at 100° C., was calcined at 500° C. for 6 hours.

1 g of zeolite prepared in this manner was suspended in a solution of 2 g of N-(4-aminobenzyl)aniline and 1 g of aniline in 20 cc of toluene. The solution was then heated for 3 hours at a temperature of 130° C., and magnetically agitated throughout.

The reaction mixture, after cooling, was submitted to analysis and was found to have the following chemical composition:

| | |
|---|---|
| Aniline | 1 g |
| N-(aminobenzyl)aniline | 0.4 g |
| 2,4'-diaminodiphenylmethane | 0.25 g |
| 4,4'-diaminodiphenylmethane | 1.35 g. |

EXAMPLES 41-49

8 g of zeolite Y in exchanged H+ form (see Example 40) were suspended in 50 ml of water in which $3.8 \times 10^{-3}$ moles of preselected metallic salt had been dissolved. The suspension was heated for settling for 2 hours, and then filtered. The solid was washed several times with distilled water and then dried at 110° C. Zeolites treated in this manner were found to have the compositions given in Table 5 below.

1 g of zeolite prepared in this manner was suspended in a solution of 2 g of N-(4-aminobenzyl) aniline and 1 g of aniline in 20 cc of benzene.

The solution was then heated for 1.5 hours at a temperature of 120° C., and magnetically agitated throughout.

After cooling, the mixture resulting from the reaction was analyzed. The results are given in Table 6 below.

TABLE 1

| | | PRODUCT SELECTIVITY (%) | | |
|---|---|---|---|---|
| ZEOLITE CATALYST | ANILINE CONVERSION % | N-(4-AMINOBENZYL) ANILINE | 2,4' DIAMINO- DIPHENYLMETHANE | 4,4' DIAMINO- DIPHENYLMETHANE |
| — | 0 | — | — | — |
| 1 | 30 | 28 | 10 | 62 |
| 2 | 29 | 14 | 11 | 75 |
| 3 | 31 | 40 | 16 | 44 |
| 4 | 6 | 50 | 20 | 30 |
| 5 | 18 | 40 | 14 | 46 |

TABLE 2

| | | PRODUCT SELECTIVITY (%) | | |
|---|---|---|---|---|
| ZEOLITE CATALYST | ANILINE CONVERSION % | N-(AMINOBENZYL) ANILINE | 2,4' DIAMINO- DIPHENYLMETHANE | 4,4' DIAMINO- DIPHENYLMETHANE |
| — | 0 | — | — | — |
| 1 | 30 | 28 | 10 | 62 |
| 2 | 29 | 14 | 11 | 75 |
| 3 | 6 | 50 | 20 | 30 |
| 4 | 16 | 16 | 14 | 70 |

TABLE 3

| NO. | SALT USED FOR EXCHANGE | $SiO_2$ (%) | $Al_2O_3$ (%) | $Na^+$ (%) | % OF METAL EXCHANGED | WEIGHT LOSS AT 450° C. (%) |
|---|---|---|---|---|---|---|
| 1 | $Fe(CH_3COO)_3 \cdot 4H_2O$ | 56.81 | 16.76 | 2.53 | 2.13 | 11.23 |
| 2 | $FeCl_3 \cdot 6H_2O$ | 54.94 | 15.54 | 1.41 | 3.30 | 17.69 |

TABLE 3-continued

| NO. | SALT USED FOR EXCHANGE | SiO₂ (%) | Al₂O₃ (%) | Na⁺ (%) | % OF METAL EXCHANGED | WEIGHT LOSS AT 450° C. (%) |
|---|---|---|---|---|---|---|
| 3 | Cu(CH₃COO)₂.H₂O | 55.68 | 15.75 | 2.95 | 2.17 | 13.68 |
| 4 | CuCl₂.2H₂O | 53.85 | 15.86 | 1.66 | 1.03 | 21.67 |
| 5 | LaCl₃.nH₂O | 51.51 | 16.34 | 1.84 | 3.76 | 22.86 |
| 6 | CaCl₂.6H₂O | 52.81 | 15.45 | 1.70 | 0.16 | 24.81 |
| 7 | NiCl₂.6H₂O | 57.31 | 16.48 | 2.30 | 1.99 | 15.28 |
| 8 | CaCl₂.6H₂O | 52.28 | 15.31 | 1.64 | 0.977 | 25.76 |
| 9 | Co(CH₃COO)₂.4H₂O | 52.81 | 15.51 | 2.66 | 2.21 | 22.43 |

TABLE 4

| EXAMPLE NO. | TABLE 3 ZEOLITE no. | ANILINE CONVERSION % | Selectivity in | | | |
|---|---|---|---|---|---|---|
| | | | N-(4-AMINO-BENZYL) ANILINE % | 2,4'-DIAMINO-DIPHENYLMETH. % | 4,4'-DIAMINO-DIPHENYLMETH. % | HIGHER OLIGOMERS % |
| 21 | 1 | 10 | 10 | 15 | 74 | 1 |
| 22 | 2 | 16 | 7 | 11 | 80 | 2 |
| 23 | 3 | 12 | 9 | 18 | 72 | 1 |
| 24 | 4 | 15 | 7 | 13 | 79 | 1 |
| 25 | 5 | 20 | 8 | 11 | 80 | 1 |
| 26 | 6 | 11 | 12 | 14 | 72 | 2 |
| 27 | 7 | 14 | 9 | 12 | 78 | 1 |
| 28 | 8 | 15 | 10 | 13 | 75 | 2 |
| 29 | 9 | 10 | 10 | 14 | 75 | 1 |

TABLE 5

| NO. | Salt used for exchange | SiO₂ % | Al₂O₃ % | Na⁺ % | Metal exchanged (%) | Loss of weight at 450° C. (%) |
|---|---|---|---|---|---|---|
| 41 | Fe(CH₃COO)₃.4H₂O | 56.81 | 16.76 | 2.64 | 2.13 | 11.23 |
| 42 | FeCl₃.6H₂O | 54.04 | 15.54 | 1.41 | 3.30 | 17.69 |
| 43 | Cu(CH₃COO)₂.H₂O | 55.68 | 15.75 | 2.95 | 2.17 | 13.68 |
| 44 | CuCl₂.2H₂O | 53.85 | 15.86 | 1.66 | 1.03 | 21.67 |
| 45 | LaCl₃.nH₂O | 51.51 | 16.34 | 1.84 | 3.76 | 22.86 |
| 46 | LaCl₂.H₂O | 52.81 | 15.45 | 1.70 | 0.16 | 24.81 |
| 47 | NiCl₂.6H₂O | 57.31 | 16.48 | 2.30 | 1.99 | 15.28 |
| 48 | CoCl₂.6H₂O | 52.28 | 15.31 | 1.64 | 0.977 | 25.76 |
| 49 | Co(CH₃COO)₂.4H₂O | 52.81 | 15.51 | 2.66 | 2.21 | 22.43 |

TABLE 6

| Example No. | Table 1 Zeolite No. | Qty of aniline recovered in g | N-(4-aminobenzyl) aniline in g | 2,4'-diaminodiphenyl-methane in g | 4,4'-diaminodiphenyl-methane in g |
|---|---|---|---|---|---|
| 50 | 1 | 1.0 | 0.40 | 0.25 | 1.35 |
| 51 | 2 | 0.9 | 0.11 | 0.19 | 1.68 |
| 52 | 3 | 1.0 | 0.30 | 0.31 | 1.38 |
| 53 | 4 | 1.0 | 0.20 | 0.27 | 1.52 |
| 54 | 5 | 0.9 | 0.12 | 0.23 | 1.65 |
| 55 | 6 | 0.9 | 0.41 | 0.29 | 1.30 |
| 56 | 7 | 0.9 | 0.22 | 0.31 | 1.46 |
| 57 | 8 | 1 | 0.20 | 0.27 | 1.52 |
| 58 | 9 | 1 | 0.30 | 0.26 | 1.44 |

We claim:

1. A process for the selective preparation of 4,4'-diaminodiphenylmethane or a derivative thereof, which comprises reacting aniline or a derivative thereof with formaldehyde or a compound capable of producing formaldehyde in situ;

said reaction being catalyzed by a zeolite catalyst selected from those based on:
(A) Si, Al, B
(B) Si, Al, Ti
(C) Si, Al
(D) Si, Ti
(E) Fe, Si, Ti
and Y zeolites and being carried out in a liquid phase in the presence of an inert solvent, said derivatives of aniline being represented by the following formula:

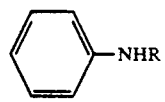

wherein R represents a —COOR¹ or —COR¹ group and R¹ represents a substituted or unsubstituted alkyl group of a substituted or unsubstituted aryl group; said reaction being carried out until any N-(4-aminobenzyl)aniline, or corresponding derivative thereof, formed as an intermediate product has been completely isomerized into 4,4'-diaminodiphenylmethane, or the corresponding derivative thereof.

2. The process according to claim 1, wherein said zeolite is based on Si, Al and B and has, in its calcined and anhydrous state, the following general formula:

$$(HAlO_2)_p \cdot (B_2O_3)_q \cdot SiO_2 \quad (1)$$

wherein p has a value of from 0.034 to 0.0050 and q has a value of from 0.1 to 0.005, the H+ of the HAlO$_2$ being exchangeable at least in part by cations, the zeolite having an X-ray diffraction spectrum, as determined on a powder sample, the significant of which are as given in the following Table A:

TABLE A

| d | I$_{rel}$ |
|---|---|
| 11.12 + 0.10 | vs |
| 9.98 + 0.10 | s |
| 9.74 + 0.10 | m |
| 6.34 + 0.07 | mw |
| 5.97 + 0.07 | mw |
| 4.24 + 0.05 | mw |
| 3.84 + 0.04 | s |
| 3.81 + 0.04 | s |
| 3.73 + 0.04 | s |
| 3.71 + 0.04 | s |
| 3.63 + 0.04 | m |
| 3.04 + 0.02 | mw |
| 2.97 + 0.02 | mw | and in IR spectrum having the following bands:

| wn | I$_{rel}$ |
|---|---|
| 1220–1230 | w |
| 1080–1110 | s |
| 890–920 | mw |
| 795–805 | mw |
| 550–560 | m |
| 450–470 | ms | wherein wn is the wave number in cm$^{-1}$ and I$_{rel}$ are the relative strengths, with a s standing for strong, ms for medium strong, m for medium, mw for medium weak and w for weak.

3. The process according to claim 1, wherein said zeolite is based on Si, Al and Ti and has, in its calcined and anhydrous state, the following general formula (expressed in terms of the molar ratios of the oxides):

$$(HAlO_2)_p \cdot (TiO_2)_q \cdot SiO_2 \quad (2)$$

wherein p has a value greater than zero and less than or equal to 0.050 and p has a value greater than zero and less than or equal to 0.025, H+ of the HAlO$_2$ being at least in part exchangeable or exchanged with cations, the zeolite having an X-ray diffraction spectrum, as determined on a powder sample, the more significant lines of which are as given in the following Table B:

TABLE B

| d | I$_{rel}$ |
|---|---|
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.86 + 0.04 | s |
| 3.82 + 0.04 | s |
| 3.75 + 0.04 | s |
| 3.72 + 0.04 | s |
| 3.65 + 0.04 | m |
| 3.05 + 0.02 | mw |

TABLE B-continued

| d | I$_{rel}$ |
|---|---|
| 2.99 + 0.02 | mw | and an IR spectrum having at least the following bands:

| wn | I$_{rel}$ |
|---|---|
| 1220–1230 | w |
| 1080–1110 | s |
| 960–975 | mw |
| 795–805 | mw |
| 550–560 | m |
| 450–470 | ms | wherein wn stands for the wave number in cm$^{-1}$ and I$_{rel}$ are the relative strengths, with s standing for strong, ms for medium strong, m for medium, mw for medium weak and w for weak.

4. The process according to claim 1, wherein said zeolite is based on Si and Al.

5. The process according to claim 1, wherein said zeolite is based on Si and Ti and has, in its calcined and anhydrous state, the following general formula:

$$(TiO_2)_x (SiO_2)_{1-x} \quad (3)$$

wherein x is from 0.005 to 0.04.

6. The process according to claim 1, wherein said zeolite is based on Si, Ti and Fe and has, in its calcined and anhydrous state, the general formula:

$$(HFeO_2)_p \cdot (TiO_2)_q \cdot SiO_2 \quad (4)$$

wherein p has a value greater than zero and less than or equal to 0.050 and q has a value greater than zero and less than or equal to 0.025, with H+ of HFeO$_2$ being at least in part exchangeable with cations, the zeolite having an X-ray diffraction spectrum, as determined on a powder sample, the more significant lines of which are as given in the following Table C:

TABLE C

| d | I$_{rel}$ |
|---|---|
| 11.14 + 0.10 | vs |
| 9.99 + 0.10 | s |
| 9.74 + 0.10 | m |
| 6.36 + 0.07 | mw |
| 5.99 + 0.07 | mw |
| 4.26 + 0.05 | mw |
| 3.86 + 0.04 | s |
| 3.82 + 0.04 | s |
| 3.75 + 0.04 | s |
| 3.72 + 0.04 | s |
| 3.65 + 0.04 | m |
| 3.05 + 0.02 | mw |
| 2.99 + 0.02 | mw | and an IR spectrum with at least the following bands:

| wn | I$_{rel}$ |
|---|---|
| 1220–1230 | w |
| 1080–1110 | s |
| 960–975 | mw |
| 795–805 | mw |
| 550–560 | m |
| 450–470 | ms | wherein wn is the wave number in cm$^{-1}$ and I$_{rel}$ are the relative strengths, where s stands for strong, ms for medium strong, m for medium, mw for medium weak and w for weak.

7. The process according to claim 1, wherein said zeolite is selected from the zeolites SK 40, SK 41 and SK 500.

8. The process according to claim 1, wherein said zeolite is in the form of microspheres comprising an amorphous oligomeric silica binder and a zeolite selected from group (A), (B), (D), or (E), the molar ratio of oligomeric silica to zeolite being from 0.05 to 0.12, and the crystals of zeolite being caged by means of Si—O—Si bridges.

9. The process according to claim 8, wherein said microspheres have a diameter of from 5 to 1000 microns.

10. The process according to claim 8, wherein said microspheres comprising oligomeric silica and a zeolite selected from groups (A), (B), (D) or (E) have been prepared by dispersing zeolite crystals in an aqueous solution of silica and tetraalkylammonium hydroxide such that said zeolite contains from 7 to 12% by weight of tetraalkylammonium and from 23 to 28% by weight of water and drying the thus obtained suspension;
said aqueous solution being prepared by the hydrolyzation in a liquid phase of a tetraalkylorthosilicate in an aqueous solution of tetraalkylammonium hydroxide at a temperature of from ambient temperature to 200° C. for a period of from 0.2 to 10 hours.

11. The process according to claim 10, wherein said tetraalkylorthosilicate is tetraethylosilicate.

12. The process according to claim 10, wherein said hydrolysis takes place at a temperature of from 40 to 100° C.

13. The process according to claim 10, wherein the alkyl group of said tetraalkylammonium contains from 1 to 5 carbon atoms.

14. The process according to claim 13, wherein said tetraalkylammonium is tetrapropylammonium.

15. The process according to claim 1, wherein said inert solvent is selected from alcohols, aromatic and aliphatic hydrocarbons, ethers, chloroaromatic and nitroaromatic compounds.

16. The process according to claim 1, wherein said reaction is carried out a temperature of from ambient temperature to 200°.

17. The process according to claim 16, wherein the temperature at which said reaction is carried out is from 70 to 150° C.

18. The process according to claim 5, wherein x is from 0.01 to 0.025.

19. The process according to claim 4, wherein said zeolite is ZSM-5.

20. A process for producing 4,4'-diaminodiphenylmethane, or derivatives thereof, which comprises the steps of:
(1) Condensing formaldehyde with an aniline compound in the presence of a zeolite catalyst so that 4,4'-diaminodiphenylmethane and N-(4-aminobenzyl)aniline, or corresponding derivatives thereof, comprise at least 70%, by weight, of the reaction product and
(2) Converting the N-(4-aminobenzyl)aniline, or corresponding derivatives thereof, produced in step (1) into 4,4'-diaminodiphenylmethane, or the corresponding derivatives thereof, by isomerizing said condensation reaction product in the presence a zeolite; said aniline compound being represented by the following formula:

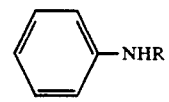

wherein R represents H, a —COOR$^1$ or a —COR$^1$ group and wherein R$^1$ represents a substituted or unsubstituted alkyl group or a substituted or unsubstituted aryl group; wherein said zeolite catalyst used in steps (1) and (2) is selected from those based on:
(A) Si, Al, B
(B) Si, Al, Ti
(C) Si, Al
(D) Si, Ti
(E) Fe, Si, Ti
and Y zeolites.

* * * * *